United States Patent
Chen et al.

(10) Patent No.: US 7,725,626 B2
(45) Date of Patent: May 25, 2010

(54) MULTI-MEDIA KVM SWITCH

(75) Inventors: Hsin-Chuan Chen, Taipei (TW); Chin-Hsing Chen, Taipei (TW)

(73) Assignee: Prolific Technology Inc., Taipei (TW)

( * ) Notice: Subject to any disclaimer, the term of this patent is extended or adjusted under 35 U.S.C. 154(b) by 144 days.

(21) Appl. No.: 12/003,745

(22) Filed: Dec. 31, 2007

(65) Prior Publication Data
US 2008/0162747 A1 Jul. 3, 2008

(30) Foreign Application Priority Data
Jan. 2, 2007 (TW) .............................. 96100125 A

(51) Int. Cl.
*G06F 13/12* (2006.01)
(52) U.S. Cl. ........................................... 710/62; 710/2
(58) Field of Classification Search ...................... None
See application file for complete search history.

(56) References Cited

U.S. PATENT DOCUMENTS 7,047,331 B2 * 5/2006 Dickens ....................... 710/63

2005/0246433 A1 * 11/2005 Carrigan et al. ............. 709/223
2008/0007549 A1 * 1/2008 Huang et al. ................ 345/213

* cited by examiner

*Primary Examiner*—Eron J Sorrell
(74) *Attorney, Agent, or Firm*—Rabin & Berdo, P.C.

(57) ABSTRACT

A multi-media KVM switch is for providing an output signal to drive a user-interface output device. The multi-media KVM switch comprises an embedded multi-media system, an arbiter and a multiplexer. The embedded multi-media system is enabled as receiving an enabling signal and providing a first device signal. The arbiter is for determining an operational state of at least a computer system in response to a second device signal outputted by the at least computer system. The arbiter provides the enabling signal to enable the embedded multi-media system when the at least a computer system is in a standby or an off state, and the arbiter is further for providing a selection signal. The multiplexer is for receiving the first and the second device signals, and outputting one of the first and the second device signals as the output signal to the user-interface output device.

7 Claims, 2 Drawing Sheets

MULTI-MEDIA KVM SWITCH

This application claims the benefit of Taiwan application Serial No. 96100125, filed Jan. 2, 2007, the subject matter of which is incorporated herein by reference.

BACKGROUND OF THE INVENTION

1. Field of the Invention

The invention relates in general to a KVM switch, and more particularly to a KVM switch including an embedded multi-media system.

2. Description of the Related Art

Along with development of technology, management policies of various computer systems are actively developed in today's market. For example, the well-known KVM switch has a port connected to more than two computer systems at a time, and an input/output port connected to a set of user-interface device, such as a keyboard, a mouse, a display and an audio device, e.g. a horn. The user can select a compute system via the KVM switch and control the computer system via a peripheral user-interface device of the KVM switch. However, how to improve the function and added value of the KVM switch is an essential subject of the relevant industrials.

SUMMARY OF THE INVENTION

The invention is directed to a KVM switch, which can effectively integrate the embedded multi-media system to improve its function and added value.

According to the present invention, a multi-media KVM switch is provided. The multi-media KVM switch is for providing an output signal to drive a user-interface output device. The multi-media KVM switch comprises an embedded multi-media system, an arbiter and a multiplexer. The embedded multi-media system is enabled as receiving an enabling signal and providing a first device signal. The arbiter is for determining an operational state of at least a computer system in response to a second device signal outputted by the at least computer system. The arbiter provides the enabling signal to enable the embedded multi-media system when the at least a computer system is in a standby or an off state, and the arbiter is further for providing a selection signal. The multiplexer is for receiving the first and the second device signals, and outputting one of the first and the second device signals as the output signal to the user-interface output device.

The invention will become apparent from the following detailed description of the preferred but non-limiting embodiments. The following description is made with reference to the accompanying drawings.

DETAILED DESCRIPTION OF THE INVENTION

An embedded multi-media system is integrated in the multi-media KVM switch of the embodiment to increase calculation and processing ability, application ability and added values of the KVM switch.

Figure 1:
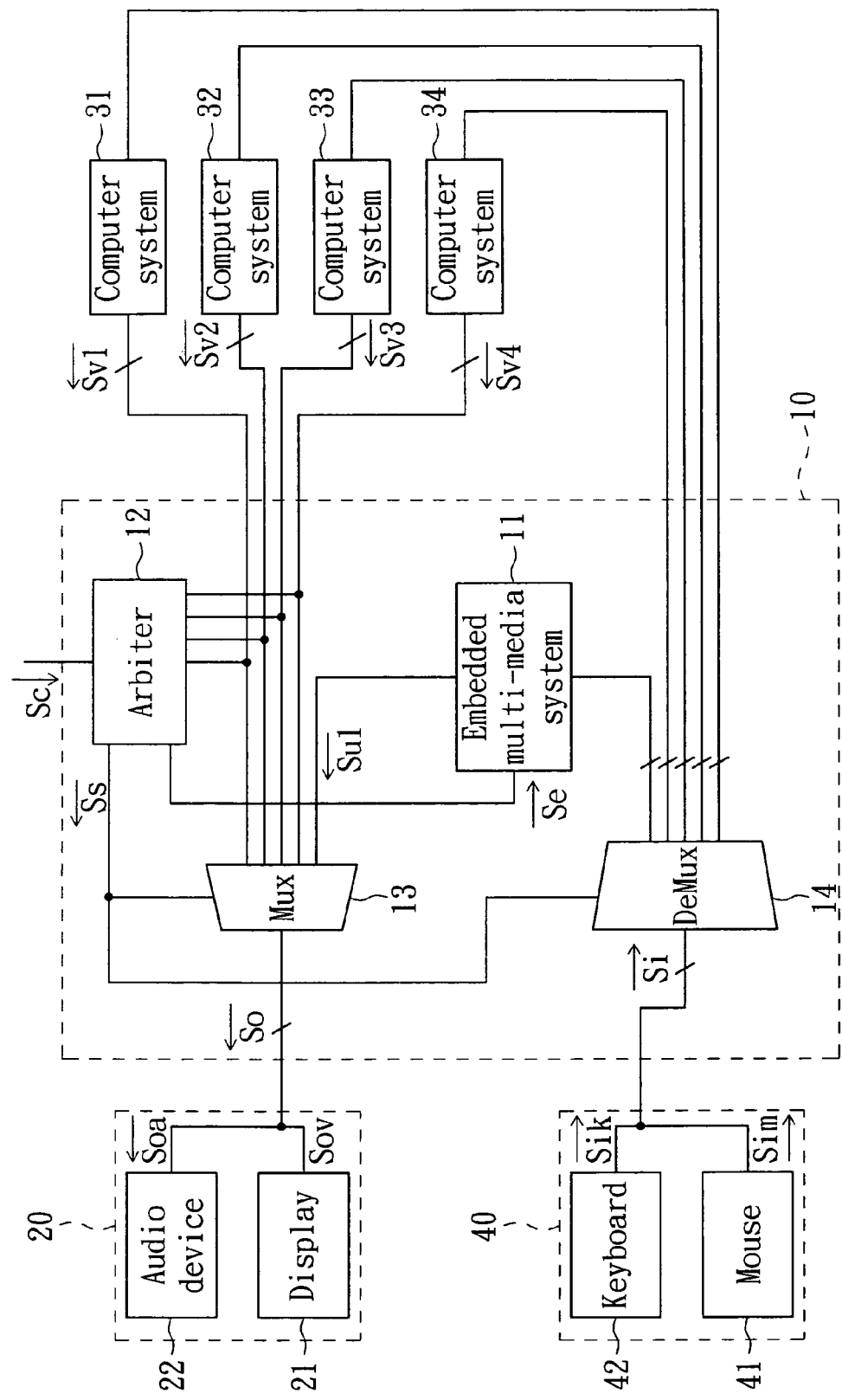
FIG. 1 is a block diagram of a multi-media KVM switch according to a preferred embodiment of the invention.

Referring to FIG. 1, a block diagram of a multi-media KVM switch according to a preferred embodiment of the invention is shown. A multi-media KVM switch 10 is coupled to a user-interface output device 20 for providing an output signal So to drive the user-interface output device 20. The multi-media KVM switch 10 includes an embedded multi-media system 11, an arbiter 12, a multiplexer (Mux) 13 and a de-multiplexer (DeMux) 14.

The embedded multi-media system 11 as receiving an enabling signal Se, is enabled to provide a device signal Su1. The arbiter 12 is used for determining an operational state of at least a computer system coupled with the multi-media KVM switch 10 according to a second device signal outputted by the at least a computer system. In the embodiment, the multi-media KVM switch 10 is exemplified to couple with four computer systems 31~34 and receive the corresponding second device signals Sv1~Sv4 for illustration. &

When the arbiter 12 determines the computer systems 31~34 to be in a standby or an off state, the arbiter 12 provides the enabling signal Se to enable the embedded multi-media system 11. Besides, the arbiter 12 is further used for providing a selection signal Ss. The multiplexer 12 receives the device signal Su1 and the second device signals Sv1~Sv4, and outputs one of the device signal Su1 and second device signals Sv1~Sv4 as the output signal So to the user-interface output device 20 in response to the selection signal Ss.

For example, the user-interface output device 20 includes a display 21 and an audio device 22, and the output signal So includes a video signal Sov and an audio signal Soa, which are transmitted via different communication connections. In the embodiment, the video signal Sov of the output signal So is transmitted via a digital video interface (DVI) or D-sub bus and the audio signal Soa is transmitted via a serial peripheral interface (SPI) bus.

In the embodiment, the second device signals Sv1~Sv4 also include audio data and video data, which are transmitted via different communication connections. The arbiter 12 receives the video signals of the second device signals Sv1~Sv4 and accordingly determines the operational states of the computer systems 31~34. For example, when the computer system 31 is in an off state, the video signal of the corresponding second device signal Sv1 has a value substantially equal to 0, and at the same time, the arbiter 12 accordingly determines the computer system 31 is in the off state.

Therefore, the multi-media KVM switch 10 of the embodiment can effectively determines the operational states of the computer systems 31~34 and when the computer systems 31~34 are in a standby or an off state, the embedded multi-media system 11 is driven to provide the device signal Su1 to the user-interface output device 20. The display 21 and audio device 22 of the user-interface output device 20 respectively provide the corresponding video data and audio data according to the video signal and audio signal thereon.

For example, the multi-media KVM switch 10 receives a device signal Si provided by a user-interface input device 40 and outputs the device signal Si to one of the computer systems 31~34 and the embedded multi-media system 10. The user-interface input device 40 includes a mouse 41 and a keyboard 42, and the device signal Si includes a mouse input signal Sim and a keyboard input signal Sik respectively generated by the mouse 41 and the keyboard 42 as applied in a user operation.

The de-multiplexer (DeMux) 14 is for receiving the device signal Si and providing the device signal Si to one of the computer systems 31~34 and the embedded multi-media system 11 in response to the selection signal Ss. The system receiving the device signal Si, such as the embedded multi-media system 11, calculates the mouse input signal Sim and the keyboard input signal Sik of the device signal Si, and outputs the corresponding video and audio data as the device signal Su1 to the user-interface output device 20 via the multiplexer 13.

The arbiter 12 further receives a control signal Sc and provides the selection signal Ss according to the control signal Sc and the video signals of the second device signals Sv1~Sv4. For example, the casing of the multi-media KVM switch 10 of the embodiment includes a number of keys (not shown in the figure) serving as a control interface for providing the control signal Sc in response to the user operation.

Figure 2:
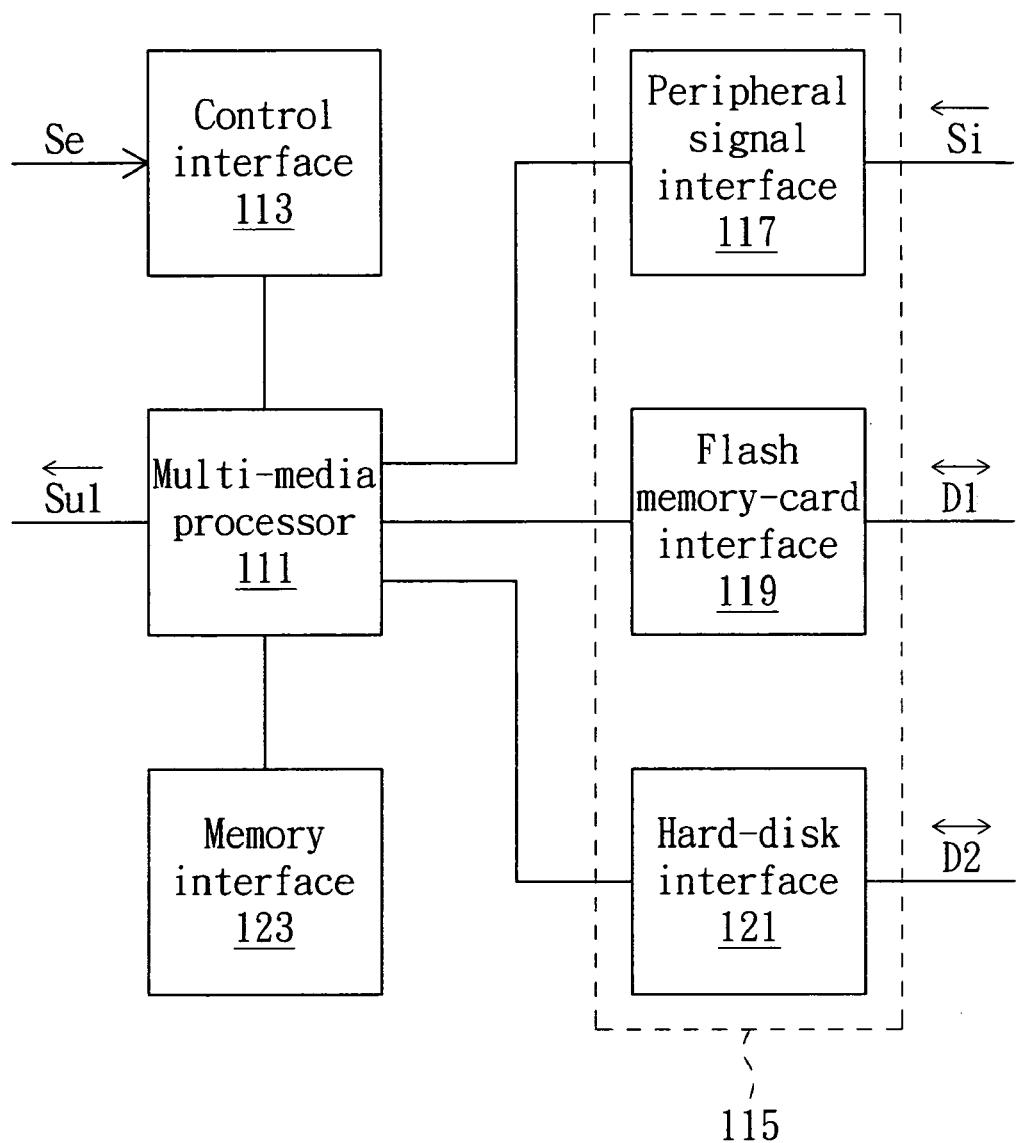
FIG. 2 is a block diagram of the embedded multi-media system of FIG. 1.

Referring to FIG. 2, a block diagram of the embedded multi-media system 11 of FIG. 1 is shown. The embedded multi-media system 11 includes a multi-media processor 111, a control interface 113 and an output/input interface 115. For example, the output/input interface 115 includes a peripheral signal interface 117, a flash memory-card interface 119, and a hard-disk interface 121. The peripheral signal interface 117 is for receiving the device signal Si, and the flash memory-card interface 119 and the hard-disk interface are respectively coupled to an external flash-memory card (not shown in the figure) and a hard disk (not shown in the figure) for accessing external data signals D1 and D2 thereon.

The multi-media processor 111 is for receiving the external data signals D1, D2 and device signal Si received by the output/input interface 115 and performing data processing and calculation on the signals D1, D2 and Si to generate and output the device signal Su1. The embedded multi-media system 11 of the embodiment further has a memory interface 123 for storing program codes and relevant register parameters for controlling the operation of the multi-media processor 111. The control interface 113 is for enabling the control interface 113, output/input interface 115, memory interface 123 and devices coupled thereon, and multi-media processor 111 of the embedded multi-media system 11.

Although the multi-media KVM switch 10 is exemplified to couple with four computer systems 31~34 and receive or transmit the second device signals Sv1~Sv4 of the computer systems 31~34 and the device signal Si for illustration in the embodiment, the multi-media KVM switch 10 is not limited to being able to receive or transmit device signals of four computer systems, but can also receive device signals of five, more than five or less than three electronic devices.

Although the casing of the multi-media KVM switch 10 is exemplified to include a number of keys for providing the control signal Sc in response to the user operation in the embodiment, the control signal Sc can also be provided by any other user-interface input device 40. For example, a user-control interface is provided by the mouse 42 or the keyboard 41 and the control signal Sc is provided by the keyboard or mouse input signal Sik or Sim generated by the user-control interface.

Although the user-interface output device 20 is exemplified to include the display 21 and audio device 22, and the user-interface input device 40 is exemplified to include the mouse 41 and keyboard 42 for illustration in the embodiment, the user-interface output and input devices 20 and 40 can also include other kinds of output/input device. For example, the user-interface output device 20 further includes a printer, projector or memory-card reader, and the user-interface input device 40 further includes a web camera or touch pad.

Although the output/input interface 115 of the embedded multi-media system 11 is exemplified to include the peripheral signal interface 117, the flash memory-card interface 119 and the hard-disk interface 121 for illustration in the embodiment, the output/input interface 115 is not limited to including the above interfaces, but can further include output/input transmission interface, such as the blue-tooth interface, wireless network interface, infra-red transmission interface, IEEE 1394 connection interface or universal serial bus (USB).

The multi-media KVM switch of the embodiment integrating the embedded multi-media system can provide various multi-media audio and video entertainment applications under some specific operational situations in response to various multi-media data transmitted via an output/input interface. Therefore, the multi-media KVM switch of the embodiment can effectively improve the drawback of the conventional KVM switch, which cannot provide multi-media audio and video entertainment applications, and can effectively increase the calculation ability and added value of the KVM switch.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-media KVM switch, for providing an output signal to drive a user-interface output device, the multi-media KVM switch comprising:
   an embedded multi-media system, enabled by an enabling signal and providing a first device signal;
   an arbiter, for determining an operational state of at least a computer system in response to a second device signal outputted by the at least a computer system, wherein the arbiter provides the enabling signal to enable the embedded multi-media system when the at least a computer system is in a standby or an off state, and the arbiter is further for providing a selection signal; and
   a multiplexer (Mux), for receiving the first and the second device signals, and outputting one of the first and the second device signals as the output signal to the user-interface output device.

2. The multi-media KVM switch according to claim 1, wherein the user-interface output device comprises a display and an audio device, and the output signal, the first device signal and the second device signal all comprise video and audio signals.

3. The multi-media KVM switch according to claim 2, wherein the arbiter determines the operational state of the at least a computer system according to the video signals of the second device signal.

4. The multi-media KVM switch according to claim 1, being further for outputting a third device signal received by a user-interface input device to one of the at least a computer system and the embedded multi-media system, the multi-media KVM switch further comprising:
   a de-multiplexer (Demux), for receiving the third device signal, and providing the third device signal to one of the at least a computer system and the embedded multi-media system in response to the selection signal.

5. The multi-media KVM switch according to claim 4, wherein the user-interface output device comprises a mouse and a keyboard, respectively for generating a mouse input signal and a keyboard input signal, and the third device signal comprises the mouse input signal and the keyboard input signal.

6. The multi-media KVM switch according to claim 1, wherein the embedded multi-media system comprises:
   an output/input interface, for receiving the third device signal and an external data signal;
   a multi-media processor, for receiving and performing data processing and calculation on the external data signal and the third device signal received by the output/input interface to generate and output the first device signal; and
   a control interface, for enabling the multi-media processor and the output/input interface in response to the enabling signal.

7. The multi-media KVM switch according to claim 1, wherein the arbiter further receives a control signal and provides the selection signal according to the control signal.

* * * * *